United States Patent [19]
Fischer et al.

[11] Patent Number: 5,782,533
[45] Date of Patent: Jul. 21, 1998

[54] VEHICLE SEAT WITH AN ADJUSTABLE-HEIGHT SEAT FRAME

[75] Inventors: Markus Fischer, Coburg; Jürgen Angermüller, Mitwitz; Bernd Krüg, Itzgrund/Schottenstein; Werner Taubmann, Lautertal; Gregor Kröner, Gundelsheim, all of Germany

[73] Assignee: Brose Fahrzeugteile GmbH & Co. KG, Coburg, Germany

[21] Appl. No.: 801,177

[22] Filed: Feb. 18, 1997

Related U.S. Application Data

[63] Continuation of Ser. No. 401,191, Mar. 9, 1995, abandoned.

[30] Foreign Application Priority Data

Mar. 11, 1994 [DE] Germany ............... 44 08 219.3

[51] Int. Cl.⁶ .................. A47C 1/022; B60N 2/16
[52] U.S. Cl. ............... 297/338; 297/344.15; 248/421
[58] Field of Search ................... 297/330, 338, 297/339, 344.15; 248/419, 421

[56] References Cited

U.S. PATENT DOCUMENTS

| | | | |
|---|---|---|---|
| 2,521,281 | 9/1950 | Brousseau | 248/421 |
| 2,942,647 | 6/1960 | Pickles | 297/330 |
| 3,006,594 | 10/1961 | Gruendler | 248/419 |
| 3,049,330 | 8/1962 | Coons et al. | 248/421 |
| 3,149,815 | 9/1964 | Cotter et al. | 248/421 |
| 3,845,982 | 11/1974 | Pickles et al. | 296/65 A |

FOREIGN PATENT DOCUMENTS

| | | | |
|---|---|---|---|
| 0490729 | 2/1930 | Germany | 297/339 |
| 3642349C32 | 9/1990 | Germany | |
| 4008662a1 | 9/1991 | Germany | |
| 4129497A1 | 3/1993 | Germany | |

Primary Examiner—Peter M. Cuomo
Assistant Examiner—Anthony D. Barfield
Attorney, Agent, or Firm—Christie, Parker & Hale, LLP

[57] ABSTRACT

A vehicle seat constructed in accordance with principles of this invention comprises stopping means that serve to conduct forces introduced via a movable belt mounting point during a frontal impact directly to the side rail, without having to transmit the entire load via the adjusting mechanism. A vehicle seat includes a seat frame having a seat belt mounting point, and an upper rail that is connected to the seat frame by at least one adjusting lever and at least one compensating lever extending from the upper rail to the seat frame. The seat includes a height adjusting mechanism for adjusting the height of the seat frame. The height adjusting mechanism includes a drive shaft connected to an end of the adjusting lever, wherein rotation of the shaft effects vertical movement of the adjusting lever and height adjustment of the seat frame. The seat includes a stopping means that limits a maximum adjustment path of the seat frame, wherein in a stop position a belt force from the seat frame is introduced directly into the upper rail and bypasses the adjusting mechanism.

2 Claims, 3 Drawing Sheets

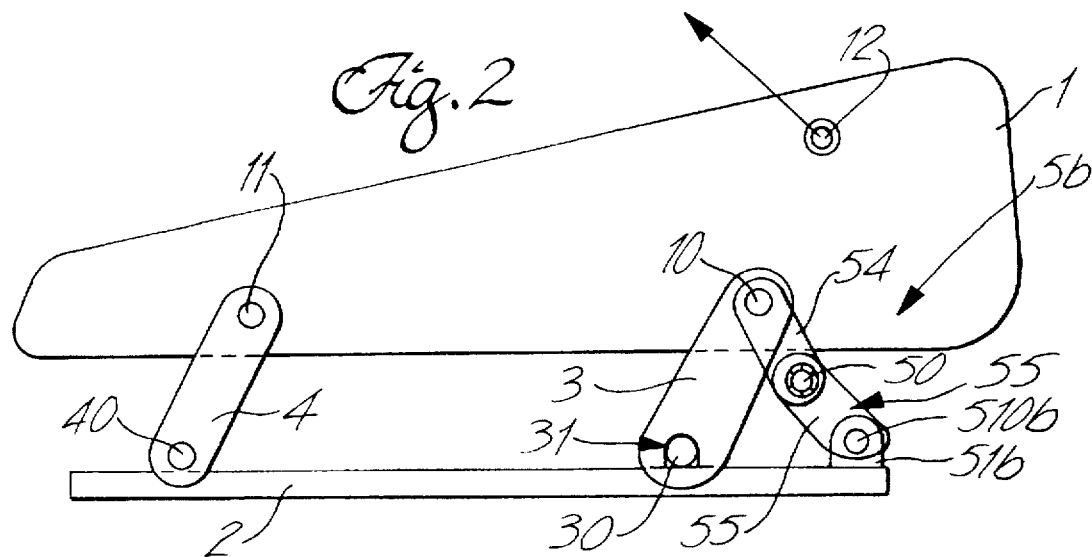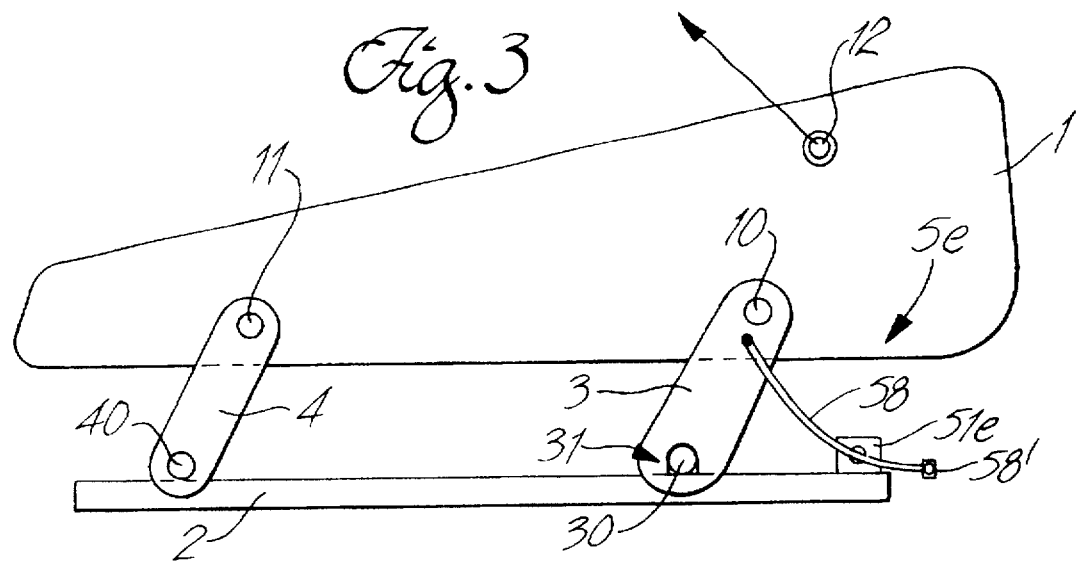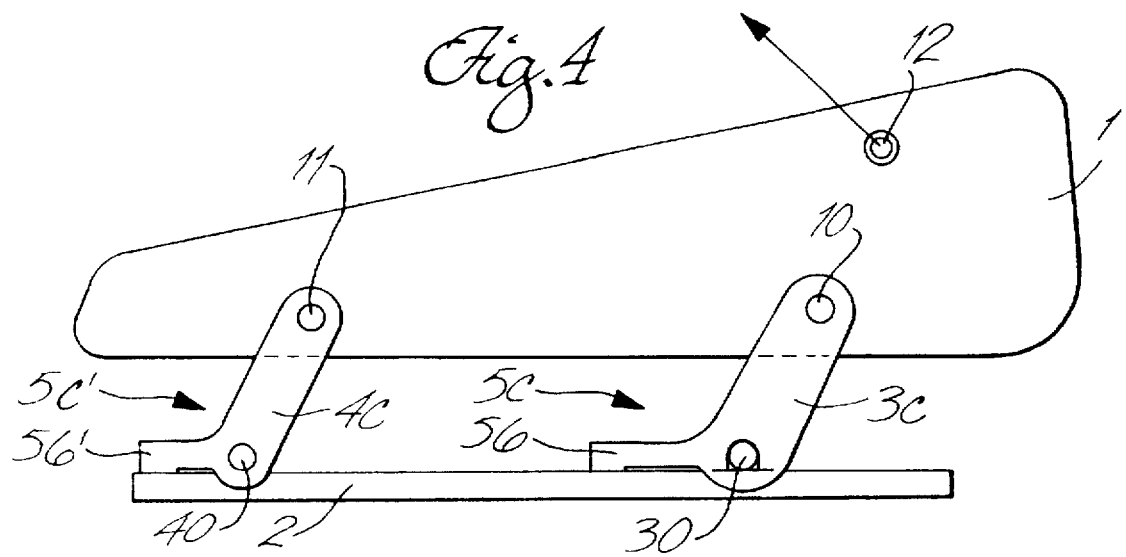

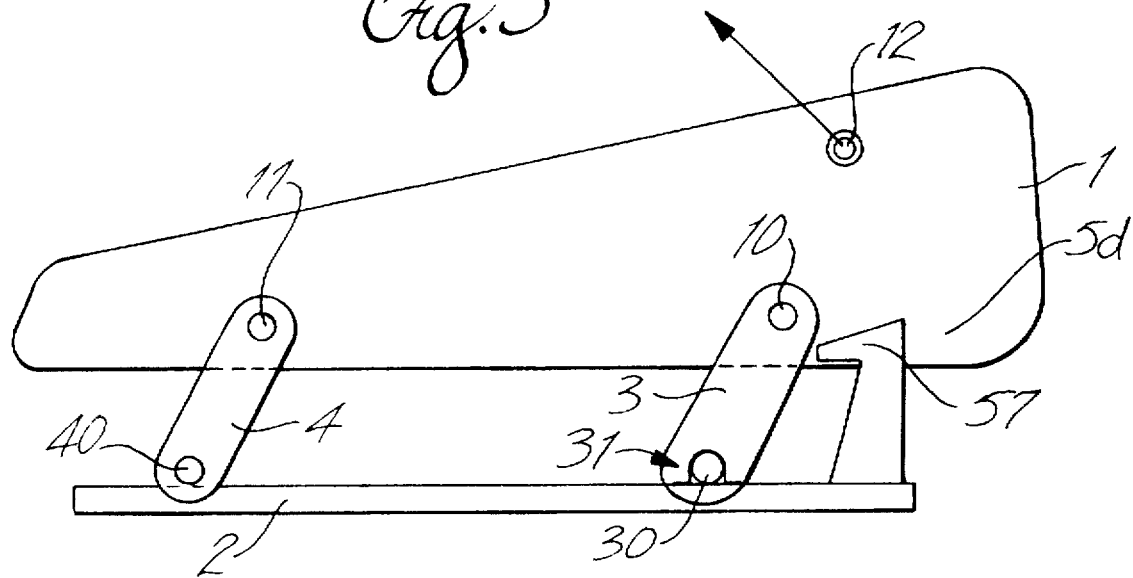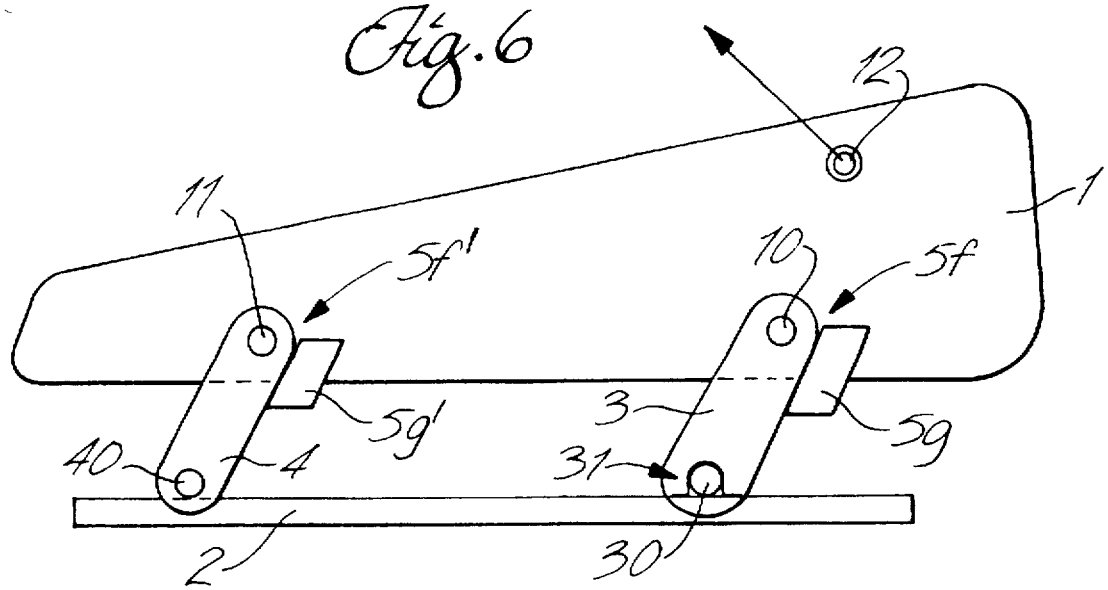

5,782,533

VEHICLE SEAT WITH AN ADJUSTABLE-HEIGHT SEAT FRAME

RELATION TO PATENT APPLICATION

This patent application is a continuation of U.S. patent application Ser. No. 08/401,191, filed on Mar. 9, 1995, now abandoned.

FIELD OF THE INVENTION

The invention relates to a vehicle seat and, more particularly, to a vehicle seat having a seat frame that is adjustable in height between an upper stop and a lower stop, and that transmits forces, initiated via a seat belt mounting point, directly to a guide rail in the event of a crash for instance, rather then having to transmit the entire load via the adjusting mechanism.

BACKGROUND OF THE INVENTION

German Patent document DE 41 29 497 A1 shows a vehicle seat comprising a four-way seat height adjustment in which both the rear and the front adjusting levers have toothed quadrants that are placed in meshing engagement with respective drive pinions. Both levers are rotatably supported on the upper rail, and their upper ends are pivotally connected to a seat frame. If a seat equipped in this way is intended to have a belt mounting point that is movable in height, or in other words is mounted on the seat frame, then in the event of a crash the adjusting levers and the associated toothed elements must absorb very major forces. This is especially true in the toothed region where only one to two teeth are meshing with one another. Accordingly, a vehicle seat constructed in this manner requires the use of materials capable of withstanding very high loads, which are thus expensive.

The construction described above for providing seat height adjustment is often impossible to achieve with directly driven adjusting levers, because of a lack of space at the various positions. Another conventional arrangement for seat height adjustment contemplates the fastening of a driving toothed quadrant on a drive shaft between the adjusting levers, as indicated in German Patent document DE 40 08 662 A1. At extreme loads resulting from an accident, the forces are additionally transmitted to the drive shaft, which generally necessitates the use of correspondingly torsionally rigid and hence heavy shafts.

One quite different way of diverting crash-dictated belt forces is offered by German Patent document DE 36 42 349 C2 that discloses a first seat part having a sawtooth-like contour that is pivotally connected to a lower seat rail. A second seat part, mounted on an adjustable-height seat frame, embraces the first part. The second seat part includes detent elements that engages and are moved past the detent teeth of the first seat part during a height adjustment, until such time as only slight forces are exerted upon the belt. If major belt forces acting in the direction of travel arise, the result is a pivoting motion of the second part and simultaneously form-locking with the first part. The belt force can thus be introduced directly into the rails, without having to take a detour via the kinematics of the seat height adjustment. A disadvantage, however, is that considerable care must be taken in the manufacture and installation for this structural unit that is relevant to safety. Moreover, its weight is considerable.

It is, therefore, desirable that an adjustable-height vehicle seat be constructed having a belt mounting point that is movable in height, which by the use of simple, economical technological means reliably prevents shifting of the seat forward beyond a defined position even in the event of a crash.

SUMMARY OF THE INVENTION

An adjustable-height seat is constructed according to principles of this invention with a belt mounting point movable in height and having at least one stopping means in order to limit the adjustment path or a predetermined, maximum-allowable deformation path of the belt. The stopping means introduces the belt force directly, in other words bypassing the adjusting mechanism for the seam height, from the seat frame to the upper rail. This prevents an undesired and simultaneously dangerous shift of the seat forward under accident conditions, without having to dissipate the forces via the driving kinematics. This also makes it possible to omit extremely sturdily dimensioned toothed elements, drive shafts and other drive parts, which saves both weight and expense.

The invention can be embodied in manifold ways with simple but effective technological means. The stop that limits the seat adjustment, i.e., that limits the shifting of the seat forward during a frontal impact, dissipates the force to be transmitted from the seat frame to the top rail of a longitudinal seat adjuster, either directly or with the interposition of at least an adjusting lever and/or compensating lever on the side where the belt mounting point is mounted.

A height-adjustable seat constructed according to principles of this invention includes a seat frame for accommodating a seat cushion, wherein the seat frame includes a seat belt mounting point, and an upper rail of a longitudinal seat adjuster. The upper rail is connected to the seat frame by at least one adjusting lever extending from the upper rail to the seat frame, and by at least one compensating lever extending from the upper rail to the seat frame. The seat includes a height adjusting mechanism for adjusting the height of the seat frame. The height-adjusting mechanism comprising a drive shaft connected to an end of the adjusting lever. Rotation of the shaft effects vertical movement of the adjusting lever and height adjustment of the seat frame.

The seat includes a stopping means independent of the height adjusting mechanism that limits a maximum adjustment path of the seat frame. In a stop position, a belt force from the seat frame, e.g., from a frontal impact and the like, is introduced directly into the upper rail and bypasses the adjusting mechanism.

The stopping means may be embodied in the form of a rigid connecting lever slidable displaced between the seat frame and upper rail, a pivotable toggle lever connected between the seat frame and upper rail, a flexible cable and the like connected at end portions to the seat frame and upper rail, lever arms extending from the adjusting and/or compensating levers to engage the upper rail, a rigid member extending from the upper rail to engage the seat frame, or stops extending from the seat rail to engage the compensating and/or adjusting levers.

BRIEF DESCRIPTION OF THE DRAWINGS

These and other features and advantages will become appreciated as the same becomes better understood with reference to the specification, claims and drawings wherein:

FIG. 2 is a schematic side elevation of a third embodiment of an adjustable-height seat comprising a pivotable stop embodied as a toggle lever;

FIG. 3 is a schematic side elevation of a fourth embodiment of an adjustable-height seat comprising a flexible connection between the upper seat rail and the seat frame in the form of a cable-like stop element;

FIG. 4 is a schematic side elevation of a fifth embodiment of an adjustable-height seat comprising a stop in the form of a rigid toggle lever;

FIG. 5 is a schematic side elevation of a sixth embodiment of an adjustable-height seat comprising a rigid stop that engages the seat frame directly; and FIG. 6 is a schematic side elevation of a seventh embodiment of an adjustable-height seat comprising one or more rigid stops that are formed onto the seat frame and that come to a stop against levers.

DETAILED DESCRIPTION OF THE INVENTION

Figure 1A:
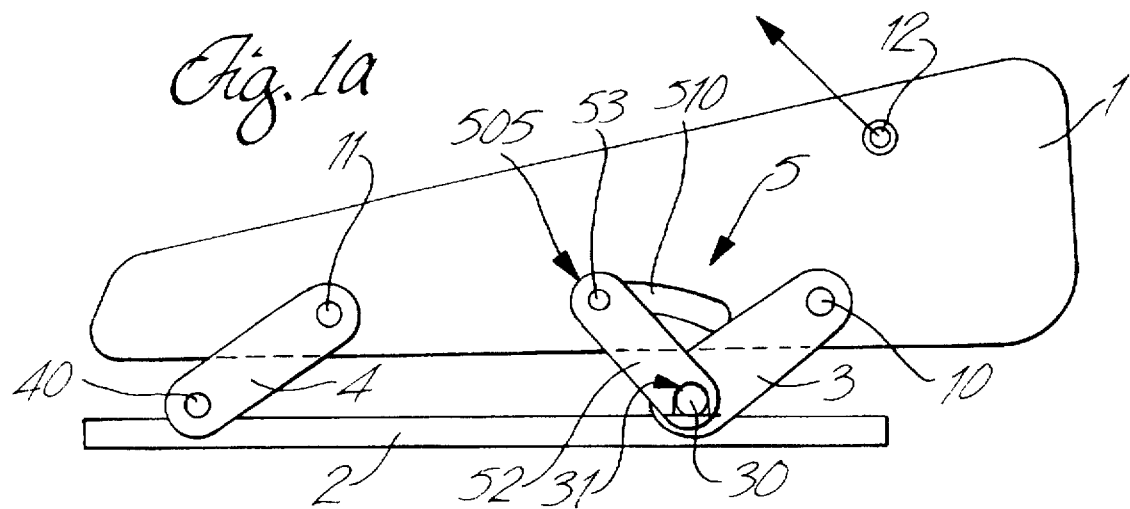
FIG. 1a is a schematic side elevation of a first embodiment of an adjustable-height seat as constructed according to principles of this invention, comprising pivotally embodied stop elements, illustrating the seat in a lower most position.
Figure 1B:
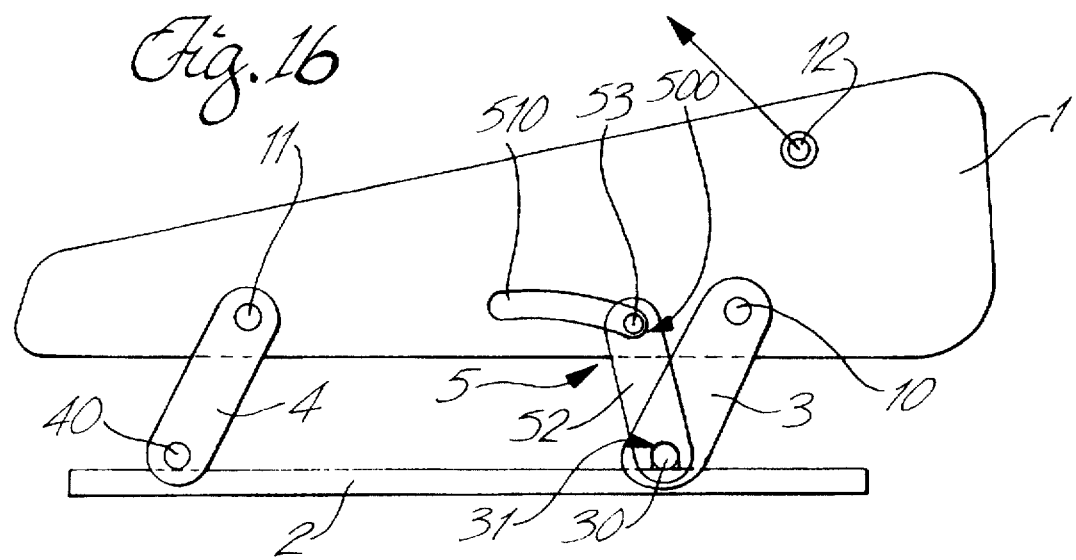
FIG. 1b is a schematic side elevation of the first embodiment of the adjustable-height seat illustrating the seat in an upper most position.

A first embodiment of a vehicle seat constructed according to principles of this invention comprises a pivotable connection between a seat frame 1 and an upper rail 2 of a longitudinal adjustment device is shown schematically in FIGS. 1a and 1b. The upper rail is slidably displacable in a longitudinal direction on a lower seat rail (not shown) that is fixedly mounted to the vehicle floor. FIG. 1a shows the seat frame 1 in a lowermost position, and FIG. 1b represents an uppermost seat position. Height adjustment of the seat is effected by a height adjustment mechanism comprising a drive shaft 30, which is connected to an adjusting lever 3 in a manner fixed against relative rotation so that rotation of the drive shaft effects vertical movement of the adjusting lever and upward or downward movement of the seat frame. A bearing block 31 presses drive shaft 30 firmly against upper rail 2. The other end of adjusting lever 3 is joined to seat frame 1 by a pivot pin 10. In its forward region, seat frame 1 is supported by a compensating lever 4. The compensating lever is joined to the seat frame and upper rail by pivot pins 11 and 40, respectively.

A first stopping means comprises a slot 510 machined into a side plate of seat frame 1. A connecting lever 52 extends from and is rotatably mounted on drive shaft 30. The connecting lever 52 includes a pin 53 that projects from an end opposite drive shaft 30 in a direction toward the seat frame 1 and into slot 510. The slot 510 includes stops 500 and 505 at each opposite slot closed end portion. In a lowermost seat position, shown in FIG. 1a, pin 53 is placed into engagement with the stop 505, thereby limiting continued downward travel of the seat. In an uppermost seat position, shown in FIG. 1b, pin 53 is placed into engagement with the stop 500, thereby limiting continued upward travel of the seat.

If the seat adjustment mechanism is exposed to an overload as a consequence of a frontal impact, with the seat belt force introduced into the seat frame via a belt mounting point 12, the seat is urged forward and upward out of its normal position, causing connecting lever to be placed into a stop position 5, as shown in FIG. 1b. The impact force can be dissipated from seat frame 1 into upper rail 2, via connecting lever 52 and bearing block 31. Dissipation of the crash forces via the adjusting mechanism, i.e., via drive shaft 30 and adjusting levers 3 and 4, is not necessary, which makes savings, in terms of expense and weight, possible in this region.

Figure 1C:
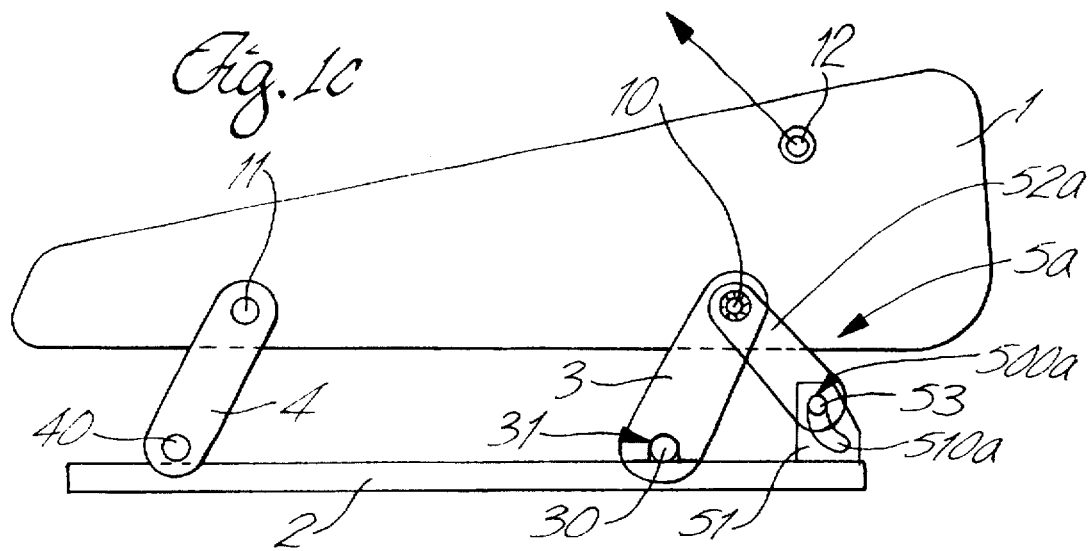
FIG. 1c is a schematic side elevation of a second embodiment of an adjustable-height seat comprising a pivotable connection between a seat frame and an upper rail on which a check element is secured.

FIG. 1c illustrates a second embodiment of a height-adjustable seat that is analogous to the version described above. The stopping means comprises a preferably integrally molded-on check element 51 that is disposed on a rear end of upper rail 2. The check element 51 includes a slot 510a, in which a pin 53a or the like connected to an end of a connecting lever 52a, is slidably guided during the adjustment of the seat. The connecting lever 52a is connected on an opposite end by a pivot pin 10 to seat frame 1. An adjusting lever 3 is attached jointly at one end with connecting lever 52a by the pivot pin 10, and is connected at an opposite end to drive shaft 30 disposed in a bearing block 31.

In an uppermost (allowable) seat position, pin 53 meets a stop 500a, formed by the contour of the slot 510a, and is placed in a stop position 5a, thereby preventing further upward adjustment of the seat. Engagement of the pin and stop 500a prevents seat frame 1 from shifting forward in that direction in the event of a frontal impact. Like the first embodiment, the second embodiment also results in dissipating a frontal impact force from seat frame 1 into upper rail 2, via connecting lever 52a and check element 51.

Referring to FIG. 2, a third embodiment of a height-adjustable seat includes a stopping means comprising a pivotable connection between seat frame 1 and upper rail 2, formed by a toggle lever 55. The toggle lever is formed from two connecting levers 54, 55 that are pivotally joined together at adjacent ends by a pivot pin 50. The toggle lever 55 is connected at one end to seat frame by a pivot pin 10, and is connected to a check element 51b by a check pin 510b. The check element 51b is preferably integral with the end portion of seat rail 2. The extended position 5b of the toggle lever determines the maximum height of the seat position. Accordingly, during a frontal impact the seat is extended to the extended position 5b, which dissipates the frontal impact force from the seat frame 1 into upper rail 2, via toggle lever 55 and check element 51b.

Referring to FIG. 3, a fourth embodiment of a height-adjustable seat includes a stopping means comprising a cable 58 or the like having an end portion firmly located on seat frame 1 or, alternatively, in an upper region of an adjusting lever 3. An opposite end of cable 58 is guided through an eye or opening in a check element 51e integral with an end portion of seat rail 2. The cable includes a stop element 58' at the end of the cable that is larger in diameter than the eye, thereby preventing passage therethrough. Accordingly, the height of seat frame 1 is limited by engagement of the stop element 58' against the eye. During a frontal impact, the seat shifts to an extended position 5e which dissipates the frontal impact force from seat frame 1 into the upper rail 2, via cable 58 and check element 51e. If desired, a flexible element other than a cable 58 could be used to form the fourth embodiment, such as a flexible rod or by some other flexible element, such as an elastic part of meandering shape.

Referring to FIG. 4, a fifth embodiment of a height-adjustable seat includes stopping means in the form of stops 5c and 5c' that are embodied by lever arms 56 and 56', respectively. The lever arms 56 and 56' are formed onto an adjusting lever 3c and a compensating lever 4c, respectively. Both lever arms 56 and 56' are disposed in the region of pins 30 and 40, toward upper rail 2. The lever arms 56 and 56' are configured such that at a predetermined maximum shift forward of the seat, e.g., during a frontal impact, lever arms 56 and 56' each enter into engagement with upper rail 2, thereby limiting upward extension of seat frame 1. Accordingly, during a frontal impact the frontal impact force is dissipated from seat frame 1 into upper rail 2, via lever arms 56 and 56'.

Referring to FIG. 5, a sixth embodiment of a height-adjustable seat comprises stopping means in the form of a rigid member 5d that is firmly connected to upper rail 2 and extends upwardly a distance toward the seat frame. A free end 57 of the stop 5d is configured in the shape of a hook. The seat frame comprises an associated stop face that is placed into engagement with a facing portion of the hook during upward extension of the seat frame to, thereby define the maximum height adjustment of the seat. Accordingly, during a frontal impact the seat is placed in an extended position, limited by action of the stop, dissipating the frontal impact force from seat frame 1 into upper rail 2, via the hook-shaped stop 5d.

Referring to FIG. 6, a seventh embodiment of a height-adjustable seat comprises stopping means in the form of stops 5f and 5f' that are each preferably attached to a side portion of the seat frame 1. The stops 5f and 5f' can either be integral with the seat frame or can be in the form of non-integral attachments. The stops 5f and 5f' are positioned on the seat frame to engage side portions of adjusting levers 3 and 4, respectively, to limit maximum seat height when the seat frame is moved in an upwardly extended position. During a frontal impact, seat 1 is placed in an extended position, limited by action of stops 5f and 5f', dissipating the frontal impact force from seat frame 1 into upper rail 2, via stops 5f and 5f'.

The disclosure of attached German patent application No. P 44 08 219.3, filed on Mar. 10, 1994 is incorporated fully herein by reference. Priority of this German application is claimed.

It is to be understood that although limited embodiments of a height-adjustable seat has been described and illustrated herein, many variations will be apparent to those skilled in the art. Since many such modifications may be made, it is to be understood that within the scope of the following claims, this invention may be practiced otherwise than specifically described.

What is claimed is:

1. A height adjustable vehicle seat comprising:
   a seat frame adapted for accommodating a seat cushion therein;
   an upper rail of a longitudinal seat adjuster disposed below the seat frame;
   a first bracket directly attached at one end to the upper rail and directly attached at an opposite end to the seat frame, wherein the first bracket is attached to one end of the seat frame;
   a second bracket directly attached at one end to the upper rail and directly attached at an opposite end to the seat frame, wherein the second bracket is attached adjacent an end of the seat frame opposite from the first bracket;
   stopping means attached to the upper rail;
   a third bracket directly attached at one end to the seat frame near the first bracket, and attached at an opposite end to the stopping means, wherein the stopping means limits movement of the third bracket end; and
   means for pivoting the first bracket about the upper rail, wherein activation of such means effects a height adjustment of the seat frame relative to the upper rail;
   wherein the second bracket is pivotally attached at opposite ends to the seat frame and upper rail, wherein the first bracket is pivotally attached at one end to the seat frame, and wherein the third bracket is pivotally attached at one end to an attachment point between the first bracket and the seat frame.

2. A height adjustable vehicle seat comprising:
   a seat frame adapted for accommodating a seat cushion therein;
   comprising an upper rail a longitudinal seat adjuster disposed below the seat frame;
   a first lever attached at one end to the upper rail and pivotally attached at an opposite end to the seat frame, wherein the first lever is attached adjacent an end of the seat frame;
   a second lever pivotally attached at one end to the upper rail and pivotally attached at an opposite end to an end of the seat frame opposite from the first lever;
   stopping means attached to the upper rail;
   a third lever attached at one end to the seat frame at an attachment point between the first lever and the seat frame, and attached at an opposite end to the stopping means, wherein the stopping means limits movement of the opposite end of the third lever; and
   means for rotating the first lever about the upper rail, wherein activation of such means effects a height adjustment of the seat frame relative to the upper rail.

* * * * *